United States Patent [19]

Yamade et al.

[11] 4,305,689
[45] Dec. 15, 1981

[54] CRANKSHAFT MILLING MACHINE

[75] Inventors: Shingo Yamade, Komatsu; Keishi Morikawa, Kanazu, both of Japan

[73] Assignee: Kabushiki Kaisha Komatsu Seisakusho, Tokyo, Japan

[21] Appl. No.: 82,085

[22] Filed: Oct. 5, 1979

[30] Foreign Application Priority Data

Oct. 11, 1978 [JP] Japan ............................... 53-124113

[51] Int. Cl.³ .......................... B23B 5/18; B23C 1/18
[52] U.S. Cl. .................................. 409/80; 51/105 SP; 82/9; 82/20; 409/200
[58] Field of Search .................. 409/166, 199, 200, 80, 409/111, 112, 123, 122; 82/9, 20; 51/105 SP

[56] References Cited

U.S. PATENT DOCUMENTS

| 3,795,161 | 3/1974 | Berbalk ..................................... 82/9 |
| 3,880,025 | 4/1975 | Kralowetz et al. ............. 409/200 X |
| 4,157,055 | 6/1979 | Marzy ............................ 409 199 X/ |

FOREIGN PATENT DOCUMENTS 46-18075 5/1971 Japan .
49-46289 5/1974 Japan .

OTHER PUBLICATIONS

"Industrial & Production Engineering" 1-1977, p. 32 by Otto Gunsser, Nürtingen.

*Primary Examiner*—Z. R. Bilinsky
*Attorney, Agent, or Firm*—Armstrong, Nikaido, Marmelstein & Kubovcik

[57] ABSTRACT

A crankshaft milling machine comprising a bed, a pair of rails fixedly secured to the bed, a spindle fixedly mounted on the bed, a chuck mounted for rotation on one end of the spindle, a first motor for imparting a rotation to the chuck, a tool guide slidably mounted on the rails, the tool guide being inverted U-shape in cross-section, a tool support movably accommodated within the tool guide, the tool support being reciprocally movable in a vertical plane, and a second motor for causing a reciprocal movement of the tool support. An internal tooth cutter is rotatably supported by the tool support and a third motor is installed for rotating the internal tooth cutter. A numerical control device is provided for controlling the relative movement of the chuck and the tool support in such a way that the rotation of the chuck is synchronized with the reciprocal movement of the tool support.

3 Claims, 13 Drawing Figures

CRANKSHAFT MILLING MACHINE

BACKGROUND OF THE INVENTION

This invention relates to a crankshaft milling machine for machining crank pins of a crankshaft used for internal combustion engines.

There has heretofore been employed a crankshaft milling machine of the kind specified which comprises an internal tooth cutter adapted to be moved transversely on and along a workpiece while the latter is rotating so as to machine crank pins of a crankshaft. However, such crankshaft milling machine has been disadvantageous in that it is necessary to overhang so much the chucks mounted on spindle heads to prevent the interference of the tool guide means with the spindle heads which support both ends of the workpiece, and therefore the rigidity of the spindle heads is reduced thereby preventing heavy cutting to be made and also the transverse movements of the internal tooth cutter cause difficulties in discharging chips.

SUMMARY OF THE INVENTION

It is therefore an object of the present invention to provide a crankshaft milling machine which can overcome the above noted problems.

Another object of the present invention is to provide a crankshaft milling machine having an inverted U-shaped tool guide thereby allowing an internal tooth cutter to be moved up and down.

A further object of the present invention is to provide a crankshaft milling machine having an inverted U-shaped tool guide wherein rigidity of a spindle head can be enhanced significantly.

A still further object of the present invention is to provide a crankshaft milling machine having an inverted U-shaped tool guide wherein chips of a workpiece to be milled can be discharged from under the tool support.

In accordance with an aspect of the present invention, there is provided a crankshaft milling machine comprising:

a bed;
a pair of rails fixedly secured to said bed;
a column fixedly secured to said bed;
a spindle head fixedly mounted on said column;
chuck means mounted for rotation on one end of said spindle head, said chuck means being adapted to clamp the crankshaft to be milled;
first motor means for imparting a rotation to said chuck means;
tool guide means slidably mounted on said rails, said tool guide means being inverted U-shape in cross-section;
tool support means movably accommodated within said tool guide means, said tool support means being reciprocally movable in a vertical direction;
second motor means for causing a reciprocal vertical movement of said tool support means;
internal tooth cutter means rotatably supported by said tool support means, said internal tooth cutter means having interchangeable cutter teeth mounted thereon;
third motor means for rotating said internal tooth cutter means; and
control means for controlling the relative movement of said chuck means and said tool support means in such a way that the rotation of said chuck means is in synchronism with the reciprocal vertical movement of said tool support means.

The above and other objects, features and advantages of the present invention will be readily apparent from the following description taken in conjunction with the accompanying drawings.

DETAILED DESCRIPTION OF THE INVENTION

Figure 4:
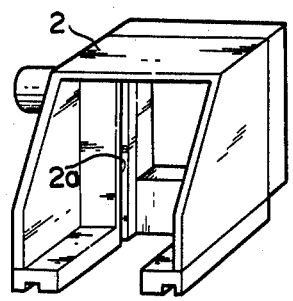
FIG. 4 is a perspective view of a tool guide means.
Figure 5:
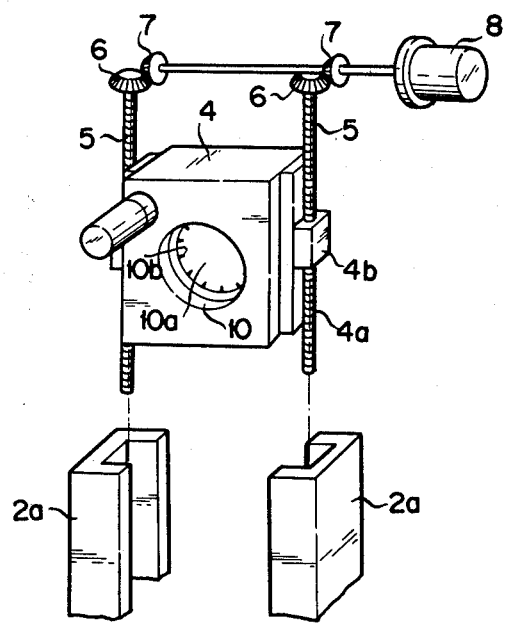
FIG. 5 is an exploded perspective view of a tool support means.
Figure 6:
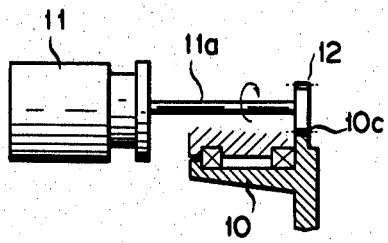
FIG. 6 is a schematic explanational view of a driving means for an internal tooth cutter.

The present invention will now be described with reference to the accompanying drawings. In the drawings, reference numeral 1 denotes a bed, and 2 a pair of tool guides adapted to be freely moved in the longitudinal direction of the bed 1 along guide rails 3 mounted on the bed 1. Each of the pair of tool guide bodies 2 has a base portion, part of which is threadably engaged with a screw rod 19 mounted on the bed 1 so as to be moved along the bed 1 by means of a horizontal feed motor 20 which rotates the screw rod 19. Each of the above-mentioned tool guide bodies 2 is formed in an inverted U-shaped structure as shown in FIG. 4 and is adapted to carry a tool support 4 therein. Each tool support 4 has convex guide portions 4a which are inserted in and carried by concave guide rails 2a formed on the inner faces of the tool guide body 2 so as to slide freely in the vertical direction. Longitudinally extending within each guide rail 2a is a screw rod 5 which is threadably engaged with a nut portion 4b projecting from each of the guide portions 4a. The upper end of each screw rod 5 is connected through gears 6 and 7 with a vertical feed motor 8 which serves to move the aforementioned tool support 4 up and down. An internal tooth cutter 10 is rotatably carried through a bearing 9 in the central part of the tool support 4. The internal tooth cutter 10 has a plurality of interchangeable cutter teeth 10b mounted in the inner periphery of a central hole 10a and a gear 10c formed on the outer periphery thereof. The gear 10c is engaged with a drive gear 12 fixedly secured to a rotary shaft 11a of a tool driving motor 11 which is attached to the tool support 4 so that the internal tooth cutter 10 can be rotated by the tool driving motor 11. Further, the tool supports 4 have work rest means 13 mounted on the opposite faces thereof, respectively. Those work rest means 13 serve to carry main journal portions J of a workpiece W when the internal tooth cutters 10 cut the crank pin portions P of the workpiece as will be mentioned later, and each of the work rest means 13 has a plurality of rest bars 13a.

Figure 1:
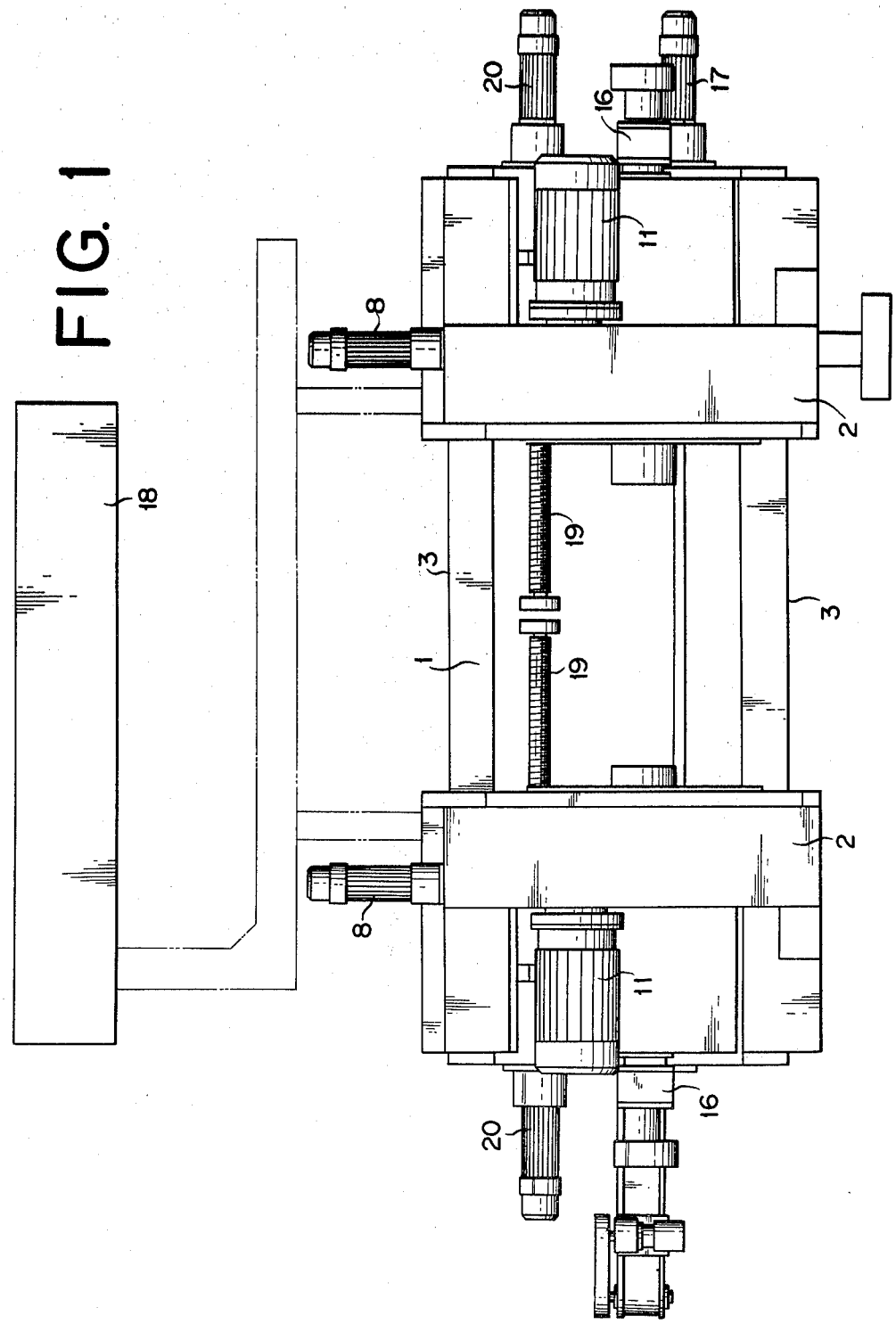
FIG. 1 is a plan view of a crankshaft milling machine according to the present invention.
Figure 2:
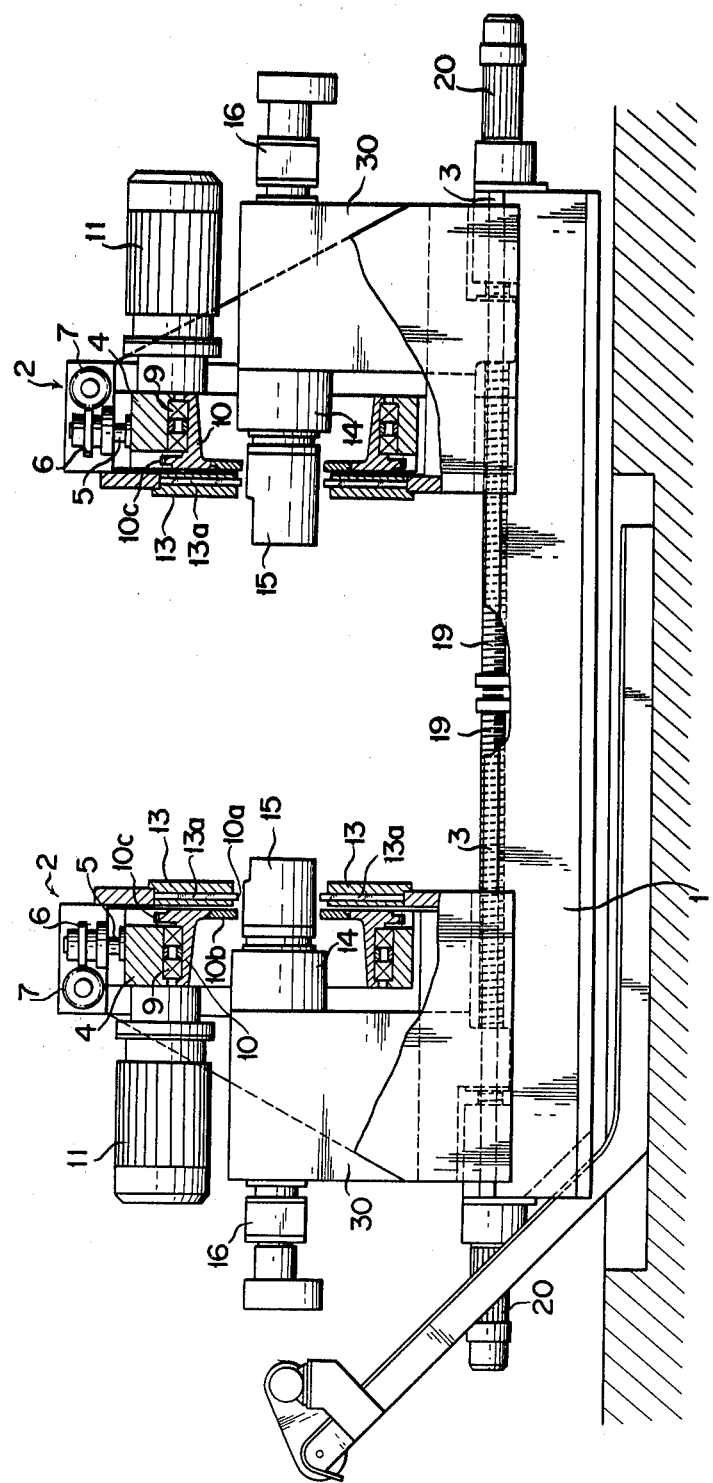
FIG. 2 is a side elevational view partially in cross-section of a crankshaft milling machine of FIG. 1.
Figure 3:
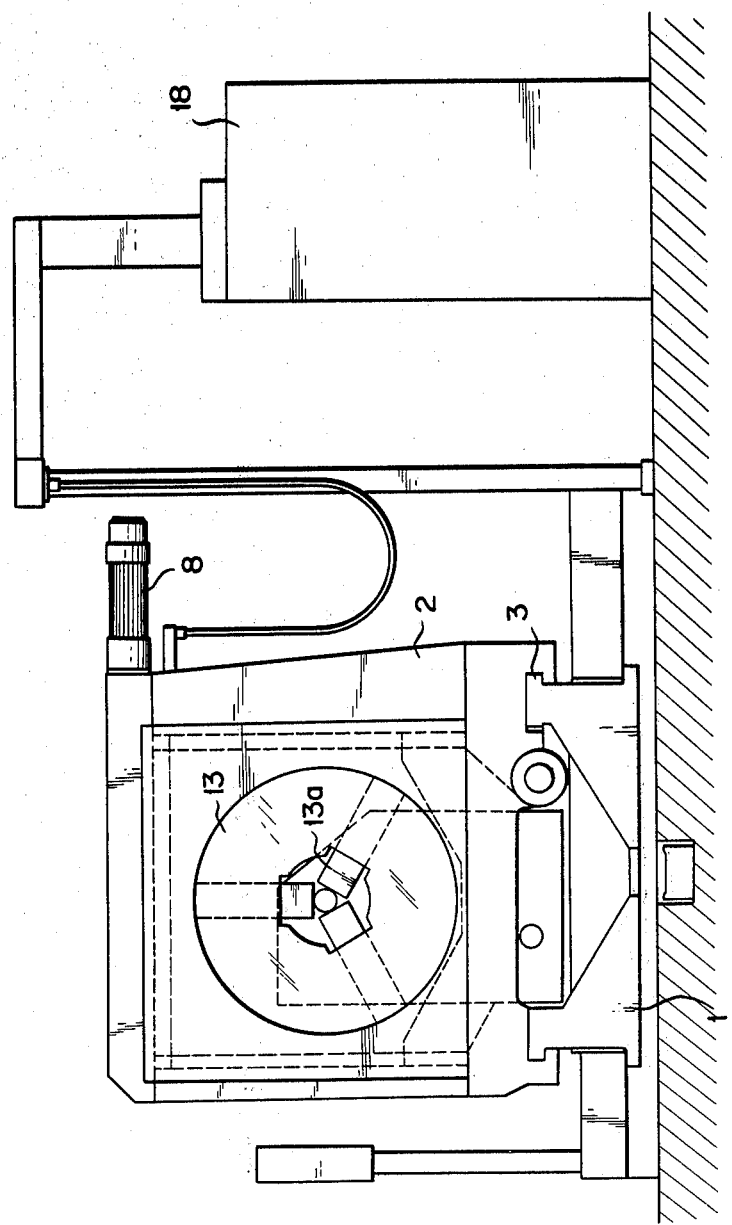
FIG. 3 is a front elevational view of a tool guide means with other parts being schematically shown.
Figure 7:
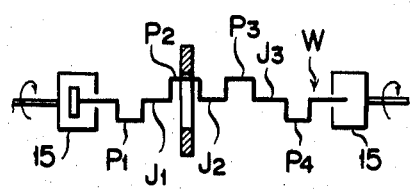
FIG. 7 and FIGS. 8A to 8F are schematic operational views showing how a crankshaft is being milled according to the present invention.
Figure 8A:
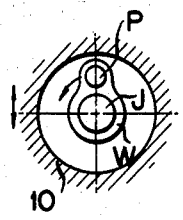
Figure 8B:
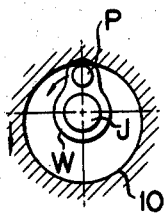
Figure 8C:
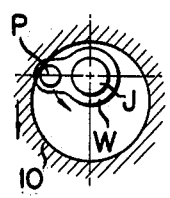
Figure 8D:
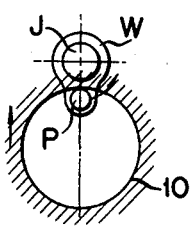
Figure 8E:
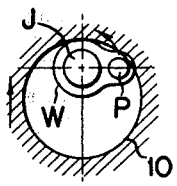
Figure 8F:
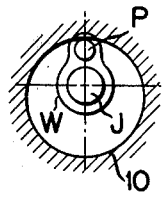

Spindle heads 14 are fixedly secured to columns 30 which in turn are mounted on both ends of the bed 1, each assembly being dimensioned so as to be accommodated from the rear within the inverted U-shaped tool guide body 2. The spindle heads 14 have chucks 15 mounted on the opposite faces thereof for rotatably holding both ends of the workpiece W. When the tool guide bodies 2 are located at their rearmost positions, each of these chucks 15 is arranged to project through a central opening formed by the internal tooth cutter 10 and the work rest means 13 in front of the tool guide body 2 as shown in FIG. 2. Mounted on the rear part of each of the spindle head 14 is a chuck cylinder 16 adapted to control the operation of the chuck 15 and a chuck driving motor 17 adapted to rotate the chuck 15 in synchronism with the vertical movements of the tool support 4. Reference numeral 18 denotes a well-known numerical control means for synchronously controlling the vertical movements of the tool support 4 and the rotation of the workpiece W. Thus, when cutting a workpiece W as shown in FIG. 7, the workpiece W is inserted in the respective internal tooth cutters 10 and its both ends are gripped by the chucks 15, and then main journal portions $J_1$ and $J_2$ adjacent to crank pin portions $P_1$ and $P_3$ to be cut by the internal tooth cutters 10 are clamped by the work rest means 13. Under such condition, the tool supports 4 are lowered from an original position as shown in FIG. 8A to the position as shown in FIG. 8B so as to allow the cutter teeth 10b of the internal tooth cutter 10 to contact with the crank pin portions $P_1$ and $P_3$ of the workpiece W, and at the same time, the workpiece W is rotated by the chuck driving motors 17 in the direction shown by the arrow in synchronism with the vertical movements of the tool supports 4. The synchronous control at that time is made by a programme which has previously been stored in the numerical control means 18. When the workpiece W is rotated to the position as shown in FIG. 8C with the downward movement of the internal tooth cutters 10, about a quarter of each of the crank pin portions $P_1$ and $P_3$ may be cut. When the internal tooth cutters 10 have reached their lowermost positions so as to cut one half of each of the crank pin portions $P_1$ and $P_3$, the internal tooth cutters 10 will commence their upward movements together with the tool supports 4 and reach the positions as shown in FIG. 8E. When the cutters reached this position, three quarters of each of the crank pin portions $P_1$ and $P_3$ have been cut, and further when the cutters reached the position as shown in FIG. 8F where the workpiece has been rotated by one revolution, the whole circumference of each of crank pin portions $P_1$ and $P_3$ have been cut. By repeating the above-mentioned operation, the crank pin portions $P_1$ and $P_3$ will be cut to a predetermined dimension. Upon completion of the cutting operation, the workpiece W is stopped to the position as shown in FIG. 8A, and also the internal tooth cutters 10 are moved upwards further with the cutter teeth 10b being moved away from the crank pin portions $P_1$ and $P_3$ which have been cut. At the same time, the work rest means 13 unclamp the main journal portions $J_1$ and $J_2$. Subsequently, the work rest means 13 will be moved towards main journal portions $J_2$ and $J_3$ adjacent to crank pin portions $P_2$ and $P_4$ to be machined next so as to clamp the main journal portions $J_2$ and $J_3$. At the same time, in the similar manner as in the case of cutting the crank pin portions $P_1$ and $P_3$, the internal tooth cutters 10 will operate as shown in FIGS. 8A and 8F while they are moved up and down by the tool supports 4 so as to cut the crank pin portions $P_2$ and $P_4$.

Although, in the above-mentioned embodiment, a two-head type machine comprising two sets of tool guide bodies 2 is employed, the same principle is applicable to a single head type machine comprising one set of tool guide body 2. Further, the milling machine of the present invention is applicable not only to machining of crankshafts but also to that of cam shafts, and the cutter teeth 10b of the internal tooth cutters 10 may be replaced by grindstones.

As described in detail hereinabove, according to the present invention, the arrangement is made such that as workpiece is rotated while the internal tooth cutters are moved up and down so as to cut the crank pin portions, and therefore the tool guide bodies for vertically movably carrying the internal tooth cutters can be formed in an inverted U-shaped structure. Therefore, it is not necessary to overhang so much the chucks mounted on the spindle heads so that the rigidity of the spindle heads can be increased thereby enabling heavy cutting to be made and an improved cutting efficiency to be obtained. Further, since chips can be discharged from under the tool supports, the discharge of chips can be made more easily than that of a conventional milling machine wherein the internal tooth cutters are arranged to be moved transversely.

It is to be understood that the foregoing description is merely illustrative of a preferred embodiment of the invention, and that the scope of the invention is not to be limited thereto, but is to be determined by the scope of the appended claims.

What we claim is:

1. A crankshaft milling machine comprising:
a bed;
a pair of rails fixedly secured to said bed;
a column fixedly secured to said bed;
a spindle head fixedly mounted on said column;
chuck means mounted for rotation on one end of said spindle head, said chuck means being adapted to clamp the crankshaft to be milled;
first motor means for imparting rotational movement to said chuck means;
tool guide means slidably mounted on said rails, said tool guide means having an inverted U-shaped cross-section;
tool support means movably mounted within said tool guide means, said tool support means being reciprocably movable in a vertical direction;
second motor means for causing a reciprocating vertical movement of said tool support means;
internal tooth cutter means rotatably supported by said tool support means, said internal tooth cutter means having interchangable cutter teeth mounted thereon;
work rest means mounted on said tool support means for supporting the crankshaft to be milled;
third motor means for rotating said internal tooth cutter means; and
control means for controlling the relative movement of said chuck means and said tool support means such that the rotation of said chuck means is in synchronism with the reciprocating vertical movement of said tool support means.

2. A crankshaft milling machine as recited in claim 1 wherein said tool guide means has formed therein a pair of vertical guide grooves and wherein said tool support means has formed thereon a pair of corresponding guide rails each being adapted to slide within the respective guide grooves.

3. A crankshaft milling machine as recited in claim 1 or 2 wherein two sets of milling assemblies are mounted on said bed, said milling assembly comprising the column, the spindle head, the chuck means, the first motor means, the tool guide means, the tool support means, the second motor means, the internal tooth cutter means, and the third motor means.

* * * * *